(12) United States Patent
Franke et al.

(10) Patent No.: US 8,680,847 B2
(45) Date of Patent: Mar. 25, 2014

(54) SEMICONDUCTOR CHIP AND METHOD FOR GENERATING PULSE EDGES, ASSIGNED SYNCHRONOUSLY TO THE MOVEMENT OF A MECHANICAL PART

(75) Inventors: Joerg Franke, Freiburg (DE); Klaus Heberle, Emmendingen (DE)

(73) Assignee: Micronas GmbH, Freiburg I, Br. (DE)

( * ) Notice: Subject to any disclaimer, the term of this patent is extended or adjusted under 35 U.S.C. 154(b) by 325 days.

(21) Appl. No.: 13/117,668

(22) Filed: May 27, 2011

(65) Prior Publication Data

US 2011/0291650 A1  Dec. 1, 2011

Related U.S. Application Data

(63) Continuation of application No. PCT/EP2009/008834, filed on Nov. 25, 2009.

(30) Foreign Application Priority Data

Nov. 27, 2008 (DE) .......................... 10 2008 059 401

(51) Int. Cl.
*G01B 7/30* (2006.01)
*G01B 7/14* (2006.01)

(52) U.S. Cl.
USPC ............... 324/207.2; 324/207.25; 324/174; 324/207.12; 324/207.24

(58) Field of Classification Search
USPC ............... 324/207.2, 207.21, 207.24, 207.25, 324/174, 207.12
See application file for complete search history.

(56) References Cited

U.S. PATENT DOCUMENTS

| 5,637,995 | A | 6/1997 | Izawa et al. |
| 6,417,662 | B1 | 7/2002 | Wallrafen |
| 6,486,657 | B2 * | 11/2002 | Schroeder ................ 324/207.21 |
| 7,382,295 | B2 * | 6/2008 | Otsuka et al. ................. 341/116 |
| 8,125,216 | B2 * | 2/2012 | Thomas et al. ............. 324/207.2 |
| 2002/0167310 | A1 | 11/2002 | Wallner et al. |
| 2005/0258820 | A1 | 11/2005 | Forster |
| 2010/0188074 | A1 * | 7/2010 | Matsumoto et al. ....... 324/207.2 |

FOREIGN PATENT DOCUMENTS

| DE | 3639208 A1 | 5/1988 |
| DE | 199 06 937 A1 | 9/2000 |
| DE | 101 22 277 A1 | 11/2002 |
| DE | 10 2004 017 191 A1 | 10/2005 |
| DE | 10 2006 055 305 A1 | 6/2007 |
| EP | 0 419 041 A1 | 3/1991 |
| GB | 2 197 483 A | 5/1988 |

* cited by examiner

*Primary Examiner* — Jay Patidar
(74) *Attorney, Agent, or Firm* — Muncy, Geissler, Olds & Lowe, P.C.

(57) ABSTRACT

In a method for generating pulse edges, assigned synchronously to the movement of a mechanical part, a magnetic field is generated. At least two measuring signals phase-shifted to one another for the magnetic field are detected. The magnetic field is changed as a function of the movement of the mechanical part in such a way that the measuring signals are modulated. A first measuring signal is compared with at least one first reference value. A second measuring signal is compared with at least one second reference value and/or the value of the first measuring signal is compared with the value of the second measuring signal. When at least one of these comparisons produces an agreement or the result of the relevant comparison changes its sign, a pulse edge is generated.

13 Claims, 9 Drawing Sheets

SEMICONDUCTOR CHIP AND METHOD FOR GENERATING PULSE EDGES, ASSIGNED SYNCHRONOUSLY TO THE MOVEMENT OF A MECHANICAL PART

This nonprovisional application is a continuation of International Application No. PCT/EP2009/008384, which was filed on Nov. 25, 2009, and which claims priority to German Patent Application No. DE 10 2008 059 401.6, which was filed in Germany on Nov. 27, 2008, and which are both herein incorporated by reference.

BACKGROUND OF THE INVENTION

1. Field of the Invention

The invention relates to a method for generating pulse edges, assigned synchronously to the movement of a mechanical part, whereby a magnetic field is generated and at least two measuring signals for the magnetic field are detected, whereby the magnetic field is changed as a function of the movement of the mechanical part in such a way that the measuring signals are modulated phase-shifted to one another. In addition, the invention relates to a semiconductor chip into which a magnetic field sensor and a signal processing unit associated therewith are integrated, whereby the magnetic field sensor has at least one first sensor element and a second sensor element, which are offset to one another and/or arranged with their measuring axes transverse to one another.

2. Description of the Background Art

A process of this type in which the sensor is designed as a soft magnetic gear disposed rotatable around an axis of rotation is disclosed in U.S. Pat. No. 5,637,995. A semiconductor chip, into which a magnetic field sensor having two magnetoresistive sensor elements is integrated, is arranged at the outer circumference of the sensor. A permanent magnet, whose magnetic flux penetrates the sensor elements and the gear, is arranged at the back of the semiconductor chip facing away from the gear. The sensor elements are formed approximately rod-shaped and inclined 45° in directions opposite to one another with their long axes toward the magnetization direction of the permanent magnets in a plane running at right angles to the axis of rotation of the gear. When the teeth of the gear move past the arrangement having the sensor elements and the permanent magnet, the direction of the magnetic flux at the sensor elements changes. The measuring signals of the sensor elements have in each case an approximately wave-shaped course, whereby the measuring signal of the one sensor element has a maximum when the measuring signal of the other sensor element has a minimum. The measuring signals are supplied to a signal converter stage, which generates a pulse edge at an output terminal, when the measuring signals pass through their maximum or minimum. The pulse edges are said to occur whenever a tooth flank of the gear moves past the magnetic field sensor. The method has the disadvantage that the detection of the maximum or of the minimum is beset with inaccuracies. As a result, a time shift may occur between the occurrence of a pulse edge and the time at which a tooth flank goes past the magnetic field sensor.

SUMMARY OF THE INVENTION

It is therefore an object of the present invention to provide a method in which the pulse edges are synchronous as precisely as possible to the movement of the mechanical part. It is a further object to provide a semiconductor chip of the aforementioned type, which makes it possible to generate a signal having pulse edges, which is synchronous as precisely as possible to the modulation of a magnetic flux penetrating the magnetic field sensor.

The object is achieved in an embodiment in that (a) a first measuring signal is compared with at least one first reference value and (b) a second measuring signal is compared with at least one second reference value, and/or (c) the value of the first measuring signal is compared with the value of the second measuring signal, and a pulse edge is generated when at least one of these comparisons produces an agreement or the result of the relevant comparison changes its sign. A comparison of two signals is taken to mean a greater than/less than comparison, a comparison for agreement, and/or the formation of the difference of the signals.

In an advantageous manner, the reference values in process steps a) and b) can each be placed in a section of the measuring signal, in which the signal has a steep slope. Thus, for example, in the case of a sinusoidal or cosinusoidal measuring signal the reference value can be in the area of the zero-crossing of the measuring signal. Because the measuring signals have a phase shift relative to one another, pulse edges generated with the use of a first measuring signal can lie between pulse edges generated with the use of a second measuring signal. Therefore, a plurality of pulse edges synchronous to the movement of the mechanical part can be generated with great precision in a simple manner.

Instead of process step b) or in addition to it, process step c) can also be used. In this case, pulse edges are generated when the measuring signals agree in value or when in the case of the difference of the value of a first measuring signal and the value of a second measuring signal there is a change in the sign of the difference. A plurality of pulse edges synchronous to the movement of the mechanical part can also be generated with great precision in this way. The checking of the agreement in value of the measuring signals can occur by comparing the measuring signals to be compared in inverted form and in addition in non-inverted form in each case with the other measuring signal and by generating the pulse edge when in at least one of these comparisons an agreement results or when in at least one of these comparisons there is a change in the sign of the difference of the measuring signals. The first reference value and the second reference value can be identical or different.

In an advantageous embodiment of the invention, a third measuring signal phase-shifted to the first measuring signal and to the second measuring signal is detected, whereby the third measuring signal is compared with a third reference value, and/or whereby the value of the first measuring signal is compared with the value of the third measuring signal, and/or whereby the value of the second measuring signal is compared with the value of the third measuring signal, and whereby a pulse edge is generated when at least one of these comparisons produces an agreement or the result of the relevant comparison changes its sign. As a result, a still greater number of pulse edges synchronous to the movement of the mechanical part can be generated. More than three measuring signals, phase-shifted with respect to one another, of the magnetic field can also be evaluated in a corresponding manner.

The measuring signals preferably correspond to magnetic field components arranged transverse and particularly at right angles to one another. The measuring signals can be measured for this purpose, for example, with the use of Hall sensors, whose measuring axes are arranged at right angles to one another.

In an embodiment of the invention, the mechanical part is placed at a number of predefined reference positions, at which in each case a measuring signal is to be compared with a reference value, whereby at a first reference position a measured value for the first measuring signal is recorded and saved as the first reference value, whereby at a second reference position a measured value for the second measuring signal is recorded and saved as the second reference value, and whereby thereafter the mechanical part is moved and steps a) and b) recited in claim 1 are performed at least once. The effect of the harmonics within the measuring signal on pulse edge generation can be weakened or suppressed by means of this calibration of the reference values.

In another embodiment of the method, the mechanical part is positioned at a number of predefined reference positions, at which in each case the first measuring signal is to be compared with the second measuring signal, whereby at each reference position in each case a measured value for the first measuring signal and for the second measuring signal is detected, whereby the difference of these measured values is formed and stored as a correction value, whereby after this the mechanical part is moved, whereby a corrected first measuring signal is formed by adding the correction value to the first measuring signal or by subtracting it from this signal, and whereby the value of the corrected first measuring signal is compared with the value of the second measuring signal and a pulse edge is generated, when the comparison produces an agreement or the result of the comparison changes its sign. The effect of the harmonics within the measuring signal on pulse edge generation can also be weakened or suppressed by this calibration.

Further, it is possible that the measuring signals are low-pass filtered, before they are compared with a reference value or another measuring signal. The low-pass filtering is used preferably, when the speed of movement of the mechanical part exceeds a predefined limit.

The aforementioned object is achieved in regard to the semiconductor chip of the aforementioned type in that the signal processing unit has a comparison unit, which is designed in such a way that a first measuring signal of the first sensor element can be compared with a first reference value and that a second measuring signal of the second sensor element can be compared with a second reference value, and/or the value of the first measuring signal can be compared with the value of the second measuring signal, and that the comparison unit has a control connection to a pulse edge generator in such a way that a pulse edge is generated when at least one of these comparisons produces an agreement or the result of the relevant comparison changes its sign.

The comparison unit can have memory places for at least one reference value and for the temporary storage of the comparison results. When the semiconductor chip is turned on or booted up, the memory places for the comparison results can be preset with starting values.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
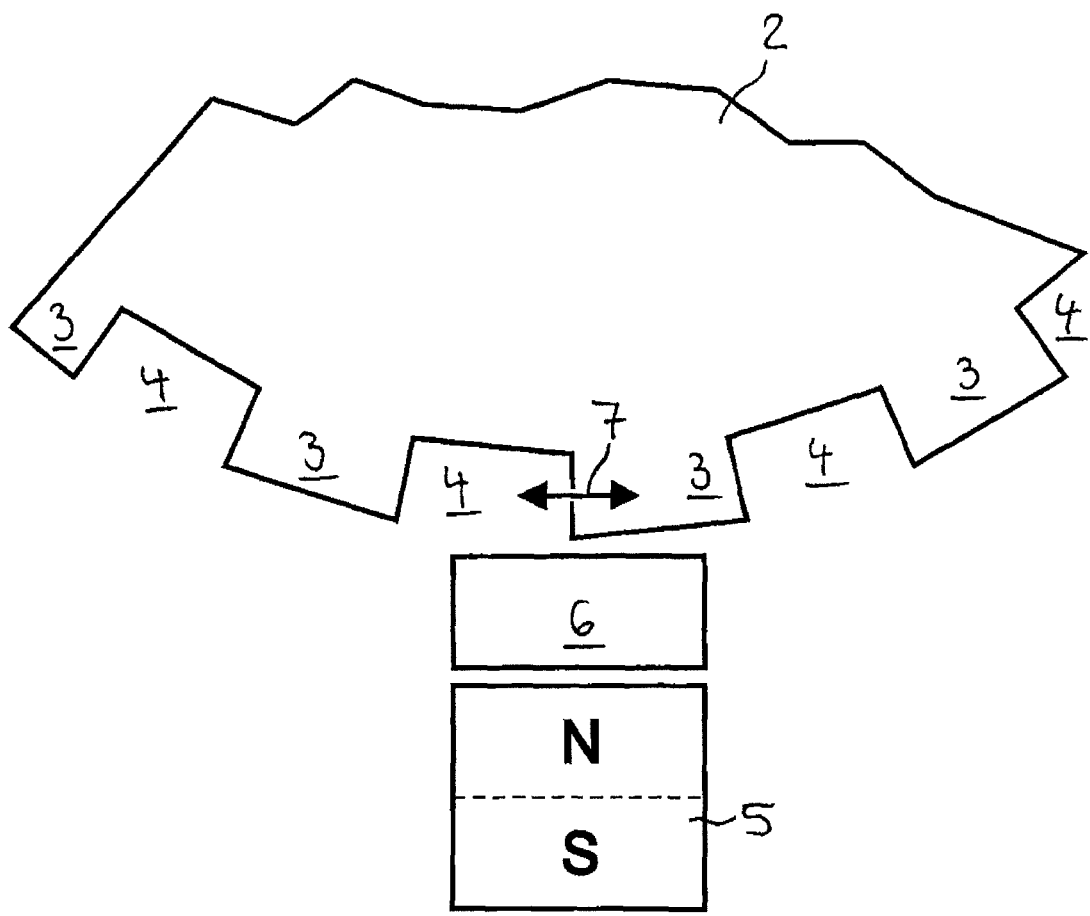
FIG. 1 shows a partial view of a measuring device to detect a relative movement between a sensor wheel having teeth and at least one magnetic field sensor integrated into a semiconductor chip.

A measuring device, which is designated as whole with 1 in FIG. 1, for detecting a relative movement has a soft magnetic sensor 2 designed as a gear, which is disposed rotatable around an axis of rotation at a support not shown in greater detail in the drawing. Gear 2 has at its outer circumference a plurality of teeth 3, which are spaced apart in the circumferential direction and between which tooth spaces 4 are formed.

Further, a permanent magnet 5 is arranged at the outer circumference of pear 2 and is separated from gear 2 by an air gap in the radial direction. Magnet 5 is magnetized approximately radially to the axis of rotation of gear 2.

In the air gap, a semiconductor chip 6 is arranged which is oriented with its chip plane parallel to the axis of rotation of gear 2 and parallel to the direction of motion 7 of teeth 3 and tooth gaps 4 that can be moved past semiconductor chip 6. A magnetic field sensor and a signal processing unit, not shown in greater detail in the drawing, are integrated into the semiconductor chip. The magnetic flux generated by magnet 5 flows through gear 2 and the magnetic field sensor.

Figure 2:
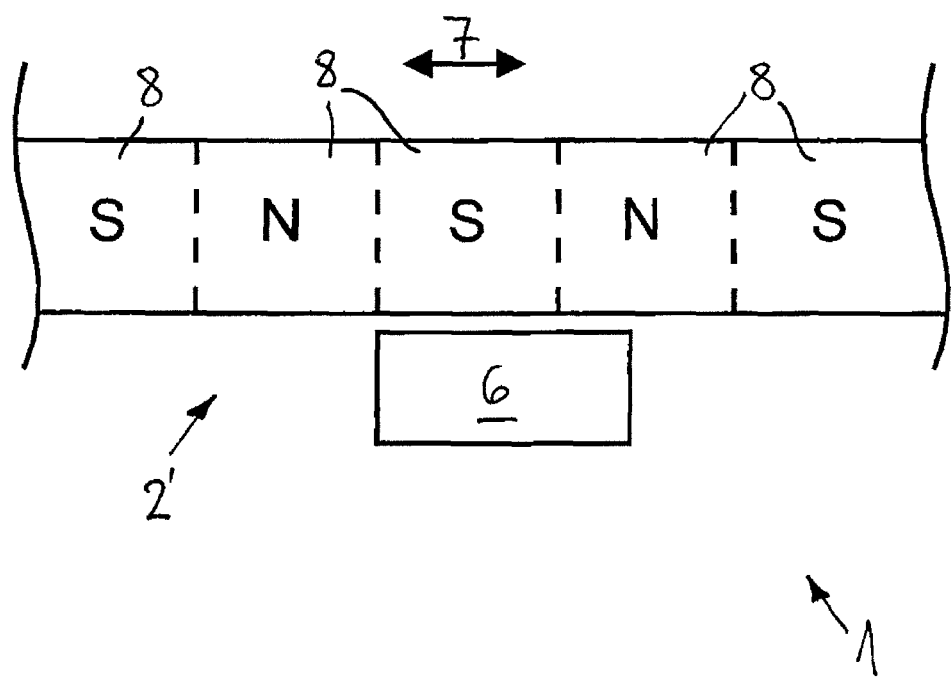
FIG. 2 shows a partial view of a measuring device to detect a relative movement between a sensor having a magnetic pole and at least one magnetic field sensor integrated into a semiconductor chip.

In the exemplary embodiment shown in FIG. 2, measuring unit 1 has a rod-shaped gear 2', which is movable in the direction of motion 7 of the relative movement. Gear 2' has a series, extending in the direction of motion 7, of magnetic poles 8, magnetized alternately in directions opposite to one another. A semiconductor chip 6 having a magnetic field sensor, which faces magnetic poles 8 with a flat side and runs with its chip plane parallel to the direction of motion 7, is arranged in the magnetic flux generated by gear 2'.

With the use of the magnetic field sensor, two measuring signals 9, 10, phase-shifted to one another, for the magnetic flux are detected. A first measuring signal 9 corresponds preferably to a first component of the magnetic field and a second measuring signal 10 to second component of the magnetic field, said second component arranged at right angles to the first component. Both components are arranged in a plane parallel to the plane of the drawing in FIGS. 1 and 2.

When teeth 3 or magnetic poles 8 move past the magnetic field sensor, the direction in which the magnetic flux penetrates the magnetic field sensor changes. In addition, the value of the magnetic flux flowing through the magnetic field sensor changes. As a result, the first measuring signal 9 is modulated in an approximately sinusoidal manner and the second measuring signal 10 in an approximately cosinusoidal manner.

Figure 3:
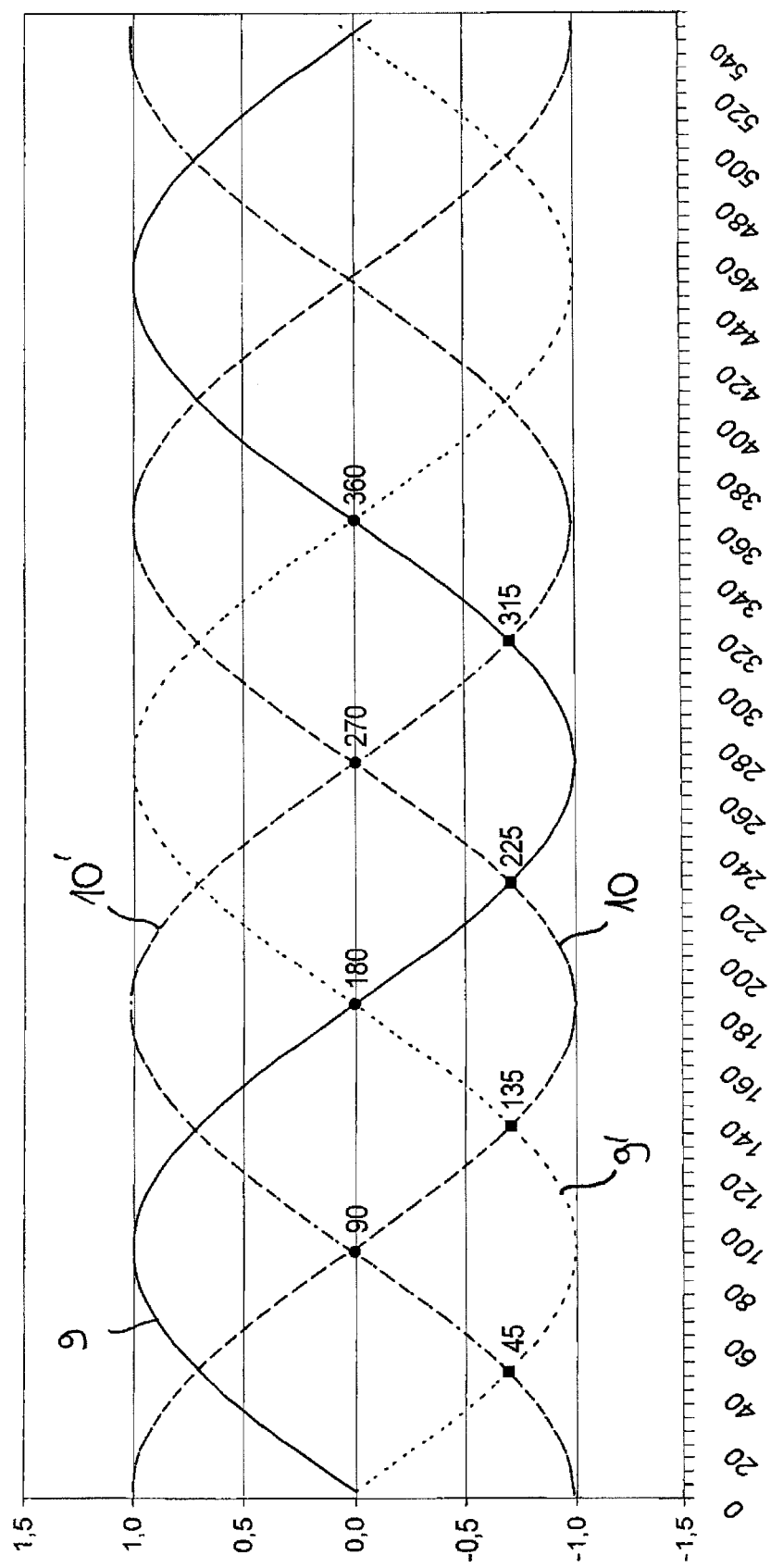
FIG. 3 shows a graphic depiction of two measuring signals for magnetic flux components, arranged at right angles to one another, in the magnetic field sensor, whereby a sinusoidal first measuring signal is shown as a solid line and a cosinusoidal second measuring signal as a dashed line, and whereby in addition the inverted measuring signals is shown as a dotted or dot-dashed line, whereby the position of a sensor is plotted on the abscissa and the amplitude of the measuring signal on the ordinate.

In the exemplary embodiment according to FIG. 3, the first measuring signal 9 and the second measuring signal 10 are each compared with the reference value zero. The reference value is selected so that the measuring signals 9, 10 have their greatest slope when they agree with the reference value.

Figure 4:
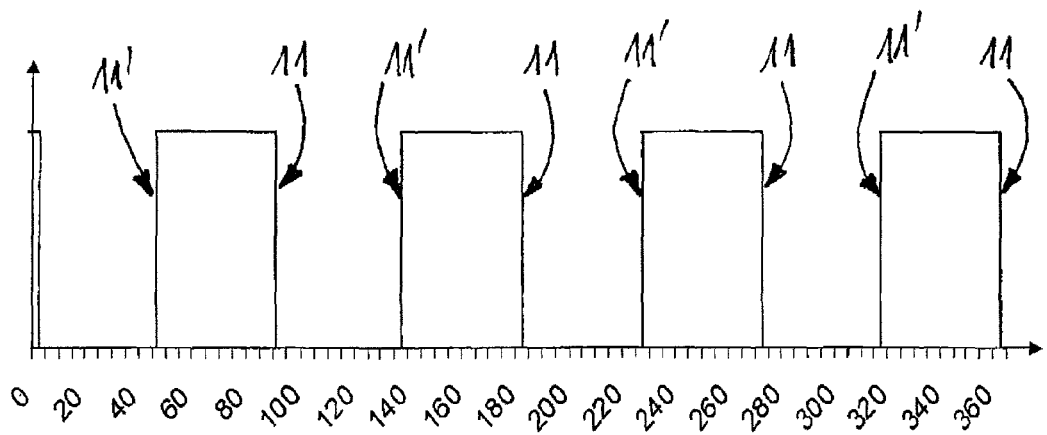
FIG. 4 shows a graphic depiction of a digital output signal of the semiconductor chip, whereby the position of the sensor is plotted on the abscissa and the amplitude of the output signal on the ordinate.

At places where the comparisons produce an agreement, in each case a pulse edge 11 is output at an output terminal of semiconductor chip 6 (FIG. 4). The corresponding places at which said pulse edges 11 are generated are marked in FIG. 3 by the points labeled with "0," "90," "180," "270," and "360."

In addition, the values of the measuring signals 9 and 10 are compared with one another and in the case of agreement of the values, additional pulse edges 11' are generated. The corresponding places at which the additional pulse edges 11' are generated are marked in FIG. 3 by the points labeled with "45," "135," "225," and "315." As is evident in FIG. 3, for comparison of the values of the measuring signals 9, 10, an inverted measuring signal 9', 10' is generated in each case for each measuring signal 9, 10.

Figure 5:
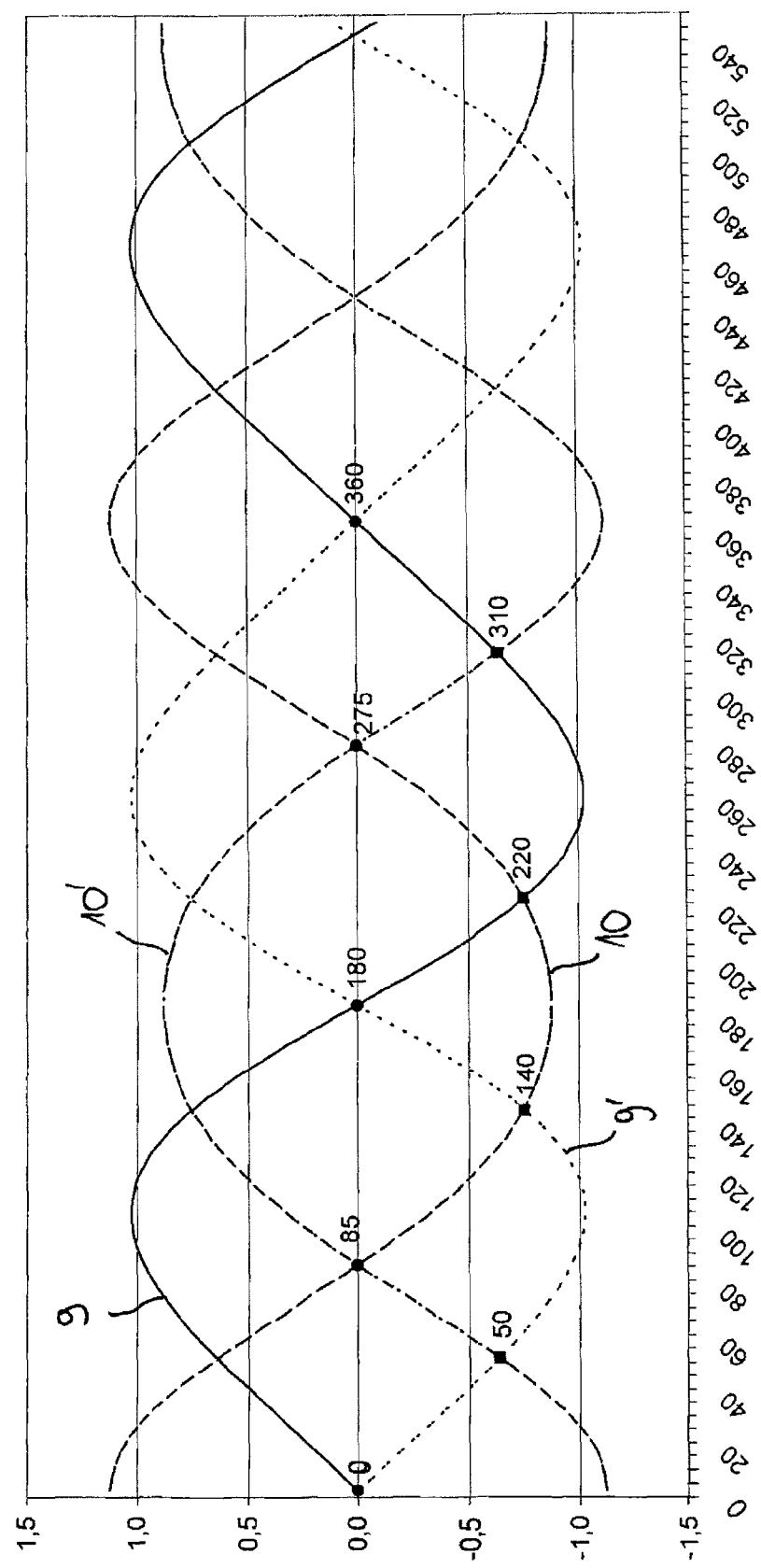
FIG. 5 shows a depiction, similar to FIG. 3, whereby however the measuring signals have harmonics.

In the exemplary embodiment shown in FIG. 5, measuring signals 9 have harmonics. It is clearly evident that the intersections between measuring signals 9, 10 or the inverted measuring signals 9', 10' in FIG. 5 differ from the corresponding intersections of measuring signals 9, 10, 9', 10' in FIG. 3.

In order to suppress the effect of the harmonics on pulse edges 11, 11', in a first process step, gear 2 is positioned at the first reference positions (0°, 180°), at which later pulse edges 11, 11' are generated. For each first reference position, at which the fundamental wave of first measuring signal 9 has a zero-crossing, a measured value is detected for the first measuring signal 9 and temporarily stored as a reference value assigned to the relevant first reference position.

For the second reference positions (90°, 270°), at which the fundamental wave of second measuring signal 10 has a zero-crossing, in each case a measured value is detected for second measuring signal 10 in a corresponding manner and temporarily stored as a reference value assigned to the relevant second reference position.

In addition, pear 2, 2' is positioned at third reference positions (45°, 135°, 225°, 315°), at which the value of the fundamental wave of first measuring signal 9 agrees with the value of the fundamental wave of second measuring signal 10.

At each third reference position, in each case a measured value for the first measuring signal and for the second measuring signal is detected. Then, the difference of these measured values is formed and saved as the correction value assigned to the relevant third reference position.

After a reference value or a correction value in each case was determined in this way for all reference positions, gear 2, 2', proceeding from a start position, is moved relative to the magnetic field sensor and measuring signals 9, 10 are detected. The first measuring signal is compared successively with the first reference values and the second measuring signal successively with the second reference values. If agreement occurs in one of these comparisons or the result of the relevant comparison changes its sign, a pulse edge 11 is generated and the reference values are updated accordingly.

For the pulse edges 11' to be generated at the third reference positions, a corrected first measuring signal is formed by subtracting the correction value saved for the relevant reference position from the first measuring signal. The value of the thus obtained corrected first measuring signal is compared with the value of the second measuring signal. If the comparison produces an agreement or the result of the comparison changes its sign, a pulse edge 11' is generated and the reference values are updated accordingly.

It is evident in FIGS. 6A-6L and 7A-7D that the magnetic field sensor has Hall sensors 12a, 12a', 12a", 12b, 12b', 12b", 12c, 13a, 13b, 13c as sensor elements. A Hall plate of at least one vertical Hall sensor 12a, 12b, 12c is arranged in a plane running radial to the axis of rotation of gear 2. The plane in which the Hall plate extends runs at right angles to the chip plane and at right angles to the direction of motion 7 of the relative movement, in which teeth 3 or tooth gaps 4 can be moved past the magnetic field sensor. The measuring signal of Hall sensor 12a, 12b, 12c thereby depends on the magnetic flux component, running in the direction of motion 7 of the relative movement. This changes when teeth 3 or tooth gaps 4 move past the magnetic field sensor.

Figure 6M:
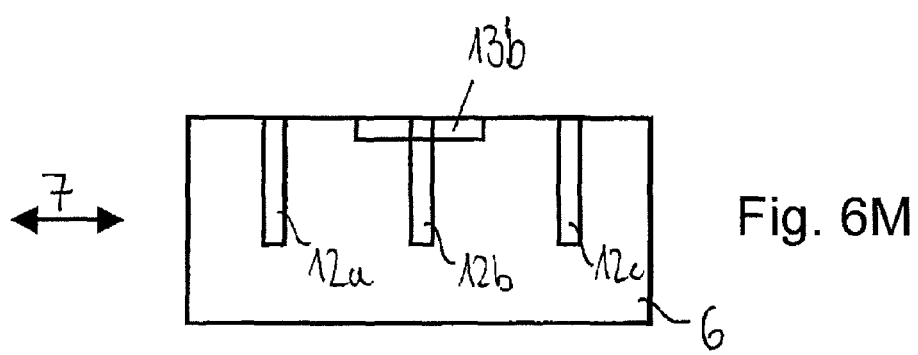
FIGS. 6A to 6M show cross sections through different exemplary embodiments of the semiconductor chip, whereby the cross-sectional planes correspond to the plane of the drawing in FIG. 1 or in FIG. 2.
Figure 6A:
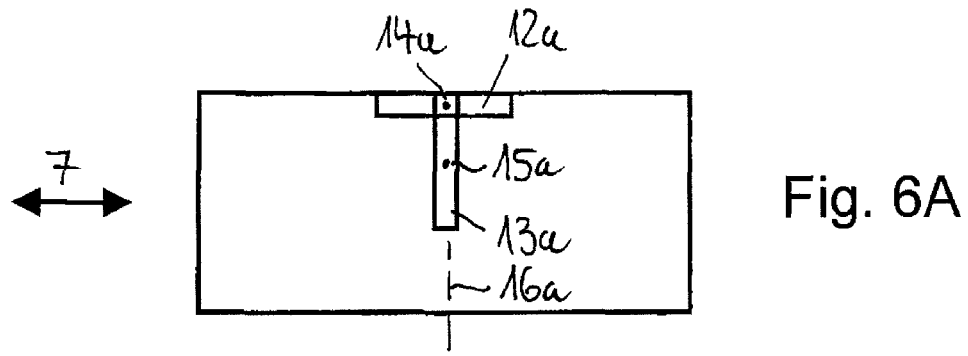

In the exemplary embodiment shown in FIG. 6A, the magnetic field sensor has, in addition to the vertical Hall sensor plane 16a, a horizontal Hall sensor 13a, which is arranged at the same place as vertical Hall sensor plane 16a. It is clearly evident that the center of the area 14a of the Hall plate of vertical Hall sensor 16a and the center of the area 15a of the Hall plate of horizontal Hall sensor 13a are arranged in the same plane 16a running at right angles to the direction of motion 7 of the relative movement. The Hall plates of Hall sensors 12a, 13a intersect in areas. Different embodiments are also conceivable, however, in which vertical Hall sensor 12a and horizontal Hall sensor 13a are spaced apart from one another in the direction of the axis of rotation of sensor 2 or at right angles to the plane of the drawing.

The tangential and radial components of the magnetic flux penetrating semiconductor chip 6 can also be measured with use of the magnetic field sensor shown in FIG. 6A, therefore at the same place.

Figure 6B:
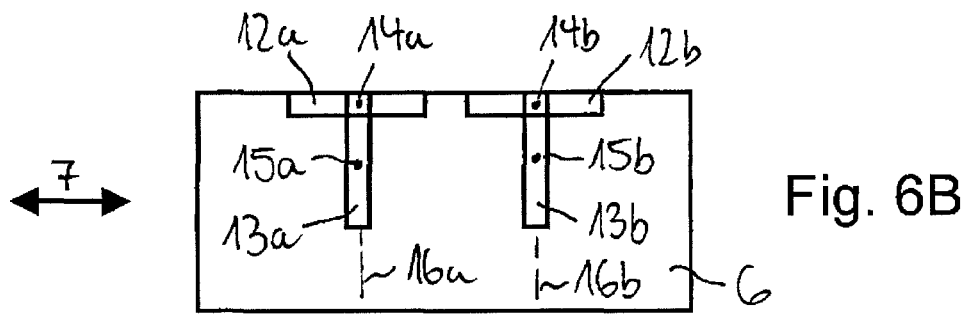

It is evident in FIG. 6B that two of the sensor arrangements consisting in each case of a vertical Hall sensor 12a, 12b and a horizontal Hall sensor 13a, 13b can also be integrated into semiconductor chip 6. The Hall plate of vertical Hall sensors 12a, 12b are parallel to one another and the Hall plates of horizontal Hall sensors 13a, 13b are arranged next to one another in a plane. The two sensor arrangements are offset to one another in the direction of motion 7 of the relative movement.

The two vertical Hall sensors 12a, 12b are in each case connected in series to their measuring signal terminals in such a way and the Hall plates of said Hall sensors 12a, 12b are supplied with current in such a way that the difference between the Hall voltages applied at the individual vertical Hall sensors 12a, 12b can be tapped at the series connection of Hall sensors 12a, 12b. In a corresponding way, the two horizontal Hall sensors 13a, 13b are connected to form a differential Hall sensor.

Figure 6C:
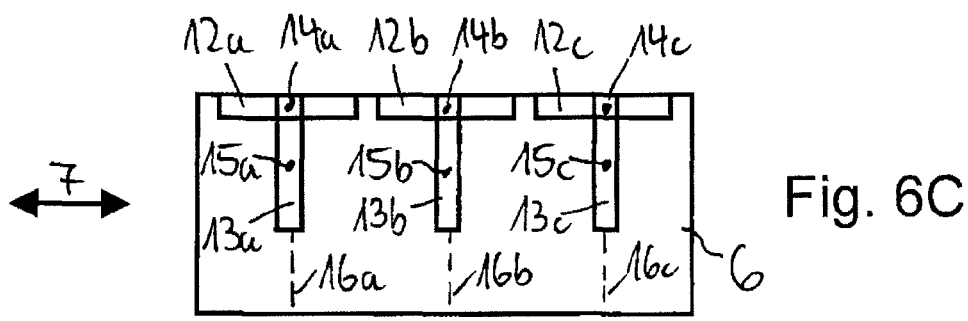

In the exemplary embodiment shown in FIG. 6C, three sensor arrangements are integrated into semiconductor chip 6, each of the arrangements consisting of a vertical Hall sensor 12a, 12b, 12c and a horizontal Hall sensor 13a, 13b, 13c. The sensor arrangement formed by Hall sensors 12b and 13b is arranged centered between the sensor arrangements consisting of Hall sensors 12a and 13a or 12c and 13c. The Hall plates of vertical Hall sensors 12a, 12b, 12c are arranged parallel to one another and the Hall plates of horizontal Hall sensors 13a, 13b, 13c next to one another in a plane, which runs parallel to the direction of motion 7 and parallel to the axis of rotation of gear 2. The three sensor arrangements are arranged in the direction of motion 7 one behind the other at the same distances to one another.

The two outer vertical Hall sensors 12a, 12c and the two outer horizontal Hall sensors 13a, 13c are each connected as a differential Hall sensor. Hall sensors 12a, 12b, 12c, 13a, 13b, 13c are connected to an evaluation device integrated into the semiconductor chip, said device which has an output terminal at which an output signal showing the direction of motion 7 of the relative movement can be output.

Figure 6D:
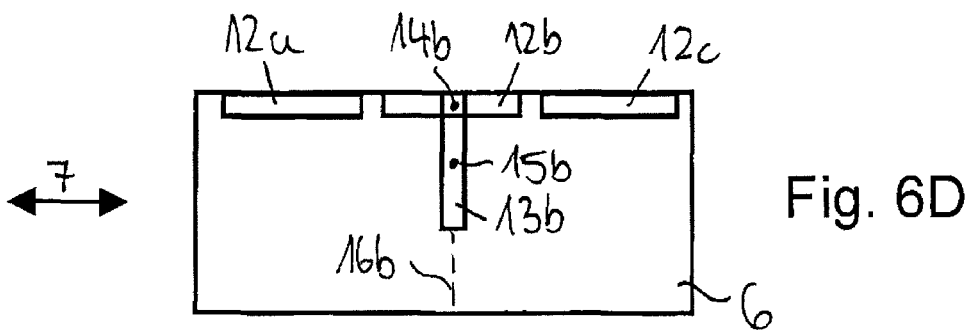

In the exemplary embodiment according to FIG. 6D, four Hall sensors are integrated into semiconductor chip 6. Three horizontal Hall sensors 13a, 13b, 13c are arranged in the chip plane at constant distances to one another in a series running in the direction of motion 7. The two outer horizontal Hall sensors 13a, 13c form a differential Hall sensor. Arranged centered between these Hall sensors 13a, 13c are another horizontal Hall sensor 13c and a vertical Hall sensor 13c. The Hall plate of vertical Hall sensor 13b runs approximately at right angles to the direction of motion 7.

Figure 6E:
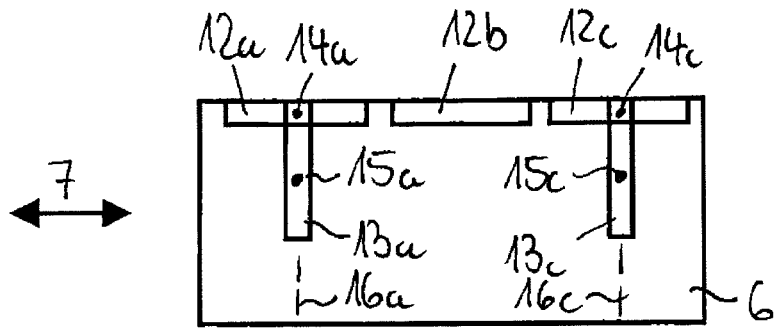

In the exemplary embodiment shown in FIG. 6E, another horizontal Hall sensor 13b is arranged between two sensor arrangements each consisting of a vertical Hall sensor 12a, 12c and a horizontal Hall sensor 13a and 13c. The Hall plates of horizontal Hall sensors 13a, 13b, 13c are each oriented parallel to the direction of motion 7. The Hall plates of the three horizontal Hall sensors 13a, 13b, 13c are arranged in the chip plane at constant distances to one another. The Hall plate of Hall sensor 13b is located centered between the Hall plates of horizontal Hall sensors 13a, 13c under horizontal Hall sensor 13b.

Figure 6F:
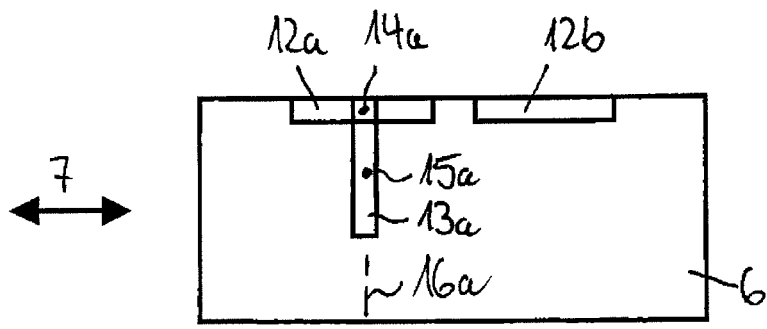

In the exemplary embodiment shown in FIG. 6F, in addition to the sensor arrangement depicted in FIG. 6A, another horizontal Hall sensor 13b is provided, whose Hall plate is arranged in the plane of the Hall plate of Hall sensor 13a and is laterally spaced apart from said sensor in the direction of motion 7.

Figure 6G:
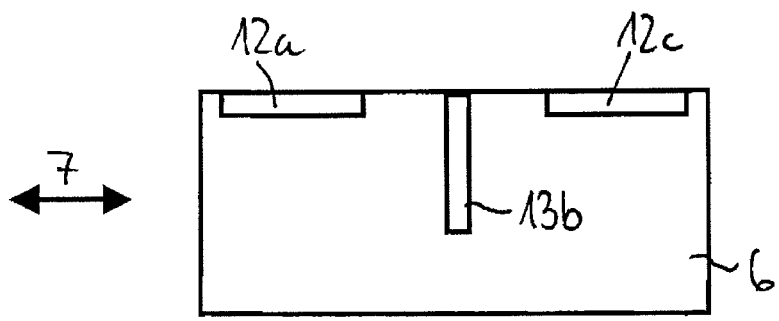

In the exemplary embodiment shown FIG. 6G, a vertical Hall sensor 12a is provided centered between two horizontal Hall sensor 13a, 13c arranged next to one another in the chip plane. The two aforementioned Hall sensors 13a, 13c can be connected to a differential Hall sensor or the measuring signals of this Hall sensor 13a, 13c can be added together. The Hall plate of vertical Hall sensor 12b is oriented approximately at right angles to the chip plane and to the direction of motion 7.

Figure 6H:
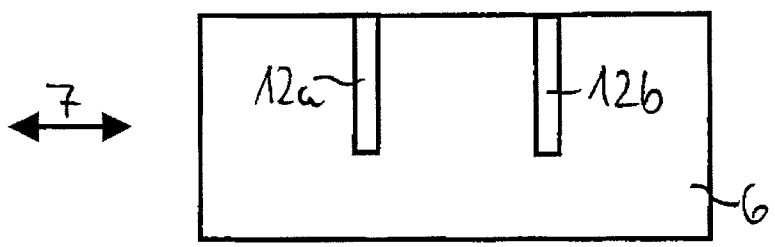

As is evident in FIG. 6H two vertical Hall sensors 12a, 12b arranged parallel to one another can also be integrated into semiconductor chip 6. The Hall plates of these Hall sensors 12a, 12b are in turn oriented at right angles to the direction of motion 7.

Figure 6I:
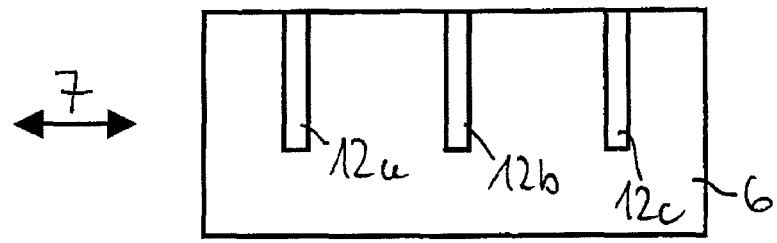
Figure 6J:
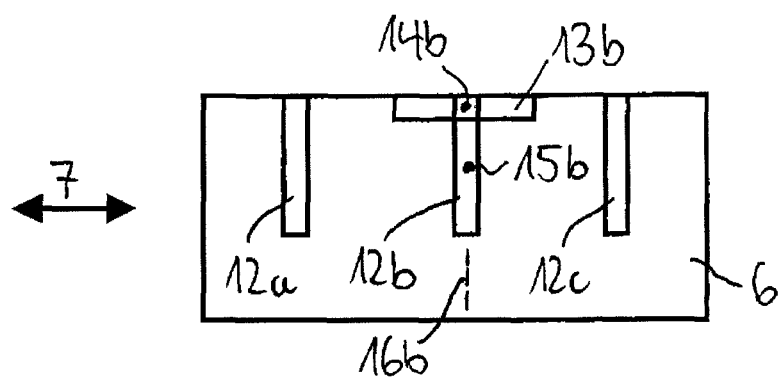

When required, at least one other vertical Hall sensor 12c can be integrated in semiconductor chip 6, and it is preferably arranged parallel to the two aforementioned Hall sensors 12a, 12b (FIG. 6I). Hall sensors 12a, 12b, 12c in this case are preferably arranged in a straight series next to one another and at constant distances to one another.

Figure 6K:
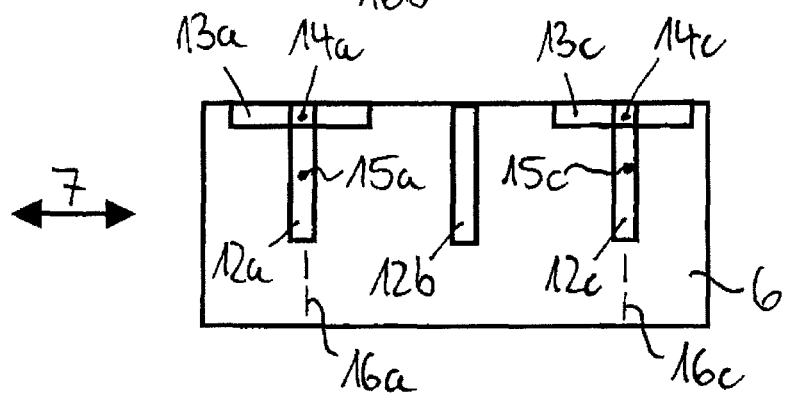

The exemplary embodiment shown in FIG. 6K corresponds to that in FIG. 6B, whereby, however, in addition another vertical Hall sensor 12b is arranged between the two sensor arrangements, each consisting of a vertical Hall sensor 12a, 12c and a horizontal Hall sensor 13a, 13c. The Hall plates of the three vertical Hall sensors 12a, 12b, 12c run parallel to one another and at right angles to the direction of motion 7. The two outer vertical Hall sensors 12a, 12c and the two outer horizontal Hall sensors 13a, 13c can be connected as a differential Hall sensor or their measuring signals can be added together. Vertical Hall sensor 12b is arranged centered between the two other vertical Hall sensors 12a, 12c.

The center of the area 14a of the Hall plate of vertical Hall sensor 12a and the center of the area 15a of the Hall plate of horizontal Hall sensor 13a are arranged in a first plane 12a running at right angles to the direction of motion 7 of the relative movement. The center of the area 14b of the Hall plate of vertical Hall sensor 12b and the center of the area 15b of the Hall plate of horizontal Hall sensor 13b are arranged in a second plane 16b running parallel to the first plane 16a. The center of the area 14c of the Hall plate of vertical Hall sensor 12c and the center of the area 15c of the Hall plate of horizontal Hall sensor 13c are arranged in a third plane 16c running parallel to the first plane 16a.

Figure 6L:
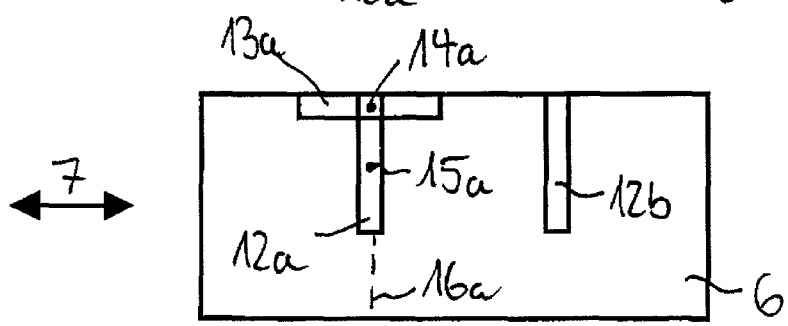

It is evident in FIG. 6L that one of the two sensor arrangements shown in the exemplary embodiment in FIG. 6K and formed by a vertical Hall sensor 12b and a horizontal Hall sensor 13b can be omitted.

As is evident in FIG. 6M, a horizontal Hall sensor 13b can be provided centered between two vertical Hall sensors 12a, 12c arranged next to one another in the chip plane. The two aforementioned Hall sensors 12a, 12c can be part of a differential Hall sensor. The measuring signals of vertical Hall sensors 12a, 12c can also be added together, however. The Hall plate of horizontal Hall sensor 13b is oriented approximately parallel to the chip plane and to the direction of motion 7.

Figure 7A:
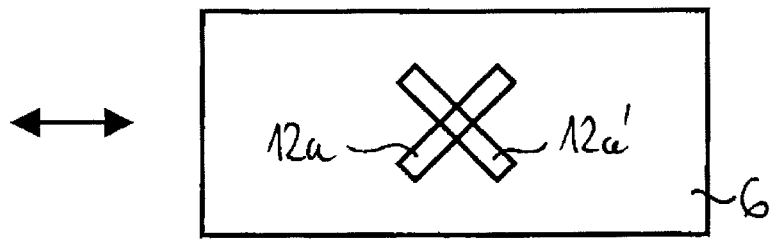
FIGS. 7A to 7D correspond to views of the side, facing the sensor, of other exemplary embodiments of the semiconductor chip.

In the exemplary embodiment shown in FIG. 7A, two vertical Hall sensors 12a, 12a' are integrated into the semiconductor chip, said sensors in which the plane of the Hall plates is arranged transverse to one another and in which the Hall plates intersect centrally. In this regard, the planes of the Hall plates are inclined at an angle of +45° or −45° to the direction of motion 7.

Figure 7B:
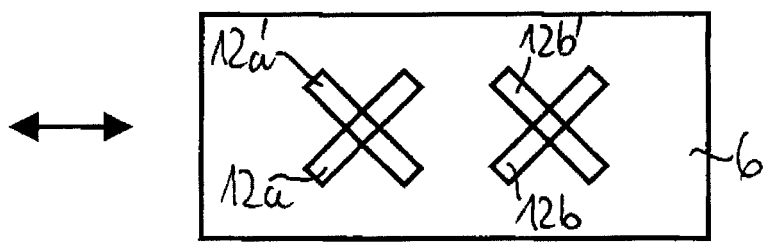

In the exemplary embodiment shown in FIG. 7B, two of the sensor arrangements, each consisting of two intersecting vertical Hall sensors 12a, 12a' or 12b, 12b', are arranged one behind the other in the direction of motion 7 in semiconductor chip 6. In this case, the Hall plates of Hall sensors 12a, 12a', on the one hand, and the Hall plates of Hall sensors 12b, 12b', on the other, are each parallel.

Figure 7C:
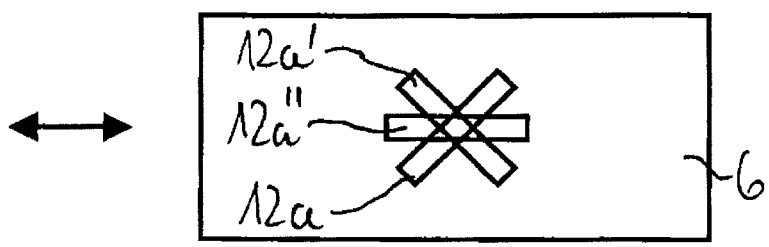

It is evident in FIG. 7C that in addition to the two vertical Hall sensors 12a, 12a', provided in FIG. 7A, another vertical Hall sensor 12a'' may be present, whose Hall plate is arranged transverse to the Hall plates of the aforementioned Hall sensors 12a, 12a'. All three Hall plates 12a, 12a', 12b'' have a common line of intersection, which in each case is arranged centered to Hall plates 12a, 12a', 12a''.

Figure 7D:
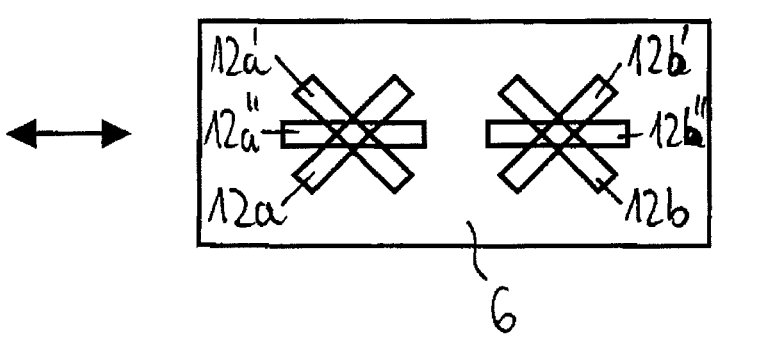

In the exemplary embodiment shown in FIG. 7D, two sensor arrangements depicted in FIG. 7C are integrated offset to one another in the direction of motion 7 into semiconductor chip 6.

It should be mentioned further that at least two Hall sensor arrangements shown in FIGS. 6A-6M and 7A-7D can also be integrated next to one another into semiconductor chip 6. This type of measuring device can be used, for example, for a linear path measurement.

Of course, it is also possible that more than three vertical Hall sensors 12a, 12a', 12a'', 12b, 12b', 12b'', 12c, 13a, 13b, 13c and/or more than three horizontal Hall sensors 13a, 13b, 13c are integrated into the semiconductor chip, for example, to measure components of the magnetic flux for more than three axes.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for generating pulse edges assigned synchronously to a movement of a mechanical part, the method comprising:
   generating a magnetic field;
   detecting at least two measuring signals for the magnetic field;
   changing the magnetic field as a function of the movement of the mechanical part such that the measuring signals are modulated phase-shifted to one another;
   comparing a first measuring signal with at least one first reference value;
   comparing a second measuring signal with at least one second reference value, or comparing the value of the first measuring signal with the value of the second measuring signal; and
   generating a pulse edge when at least one of the comparisons produces an agreement or a result of the relevant comparison changes its sign.

2. The method according to claim 1, wherein a third measuring signal is detected phase-shifted to the first measuring signal and to the second measuring signal, wherein the third measuring signal is compared with a third reference value and/or the value of the first measuring signal is compared with the value of the third measuring signal, or the value of the second measuring signal is compared with the value of the third measuring signal, and a pulse edge is generated when at least one of these comparisons produces an agreement or the result of the relevant comparison changes its sign.

3. The method according to claim 1, wherein the first reference value is spaced apart from the maximum and from the minimum of the first measuring signal and corresponds to a midpoint between a maximum and a minimum of the first measuring signal, and/or wherein the second reference value is spaced apart from the maximum and from the minimum of the second measuring signal and corresponds to the midpoint between the maximum and the minimum of the second measuring signal, or wherein the third reference value is spaced apart from the maximum and from the minimum of the third measuring signal and corresponds to the midpoint between the maximum and the minimum of the third measuring signal.

4. The method according to claim 1, wherein the measuring signals correspond to magnetic field components, arranged transverse and at right angles to one another.

5. The method according to claim 1, wherein the mechanical part is placed at a number of predefined reference positions, at which in each case a measuring signal is to be compared with a reference value, at a first reference position a measured value for the first measuring signal is recorded and saved as the first reference value, at a second reference position a measured value for the second measuring signal is recorded and saved as the second reference value, and thereafter the mechanical part is moved and the step of comparing the first measuring signal with the first reference value and the step of comparing the second measuring signal with the second reference value are performed at least once.

6. The method according to claim 1, wherein the mechanical part is positioned at a number of predefined reference positions, at which in each case the first measuring signal is to be compared with the second measuring signal, at each reference position in each case a measured value for the first measuring signal and for the second measuring signal is detected, the difference of these measured values is formed and stored as a correction value, after this the mechanical part is moved, a corrected first measuring signal is formed by adding the correction value to the first measuring signal or by subtracting it from this signal, and the value of the corrected first measuring signal is compared with the value of the second measuring signal and a pulse edge is generated when the comparison produces agreement or the result of the comparison changes its sign.

7. The method according to claim 1, wherein the measuring signals are low-pass filtered, before they are compared with a reference value or another measuring signal.

8. A semiconductor chip comprising:
   a magnetic field sensor; and
   a signal processing unit associated with the magnetic field sensor, the magnetic field sensor and the signal processing unit being integrated with the semiconductor chip,
   wherein the magnetic field sensor has at least one first sensor element and a second sensor element, which are offset to one another or arranged with their measuring axes transverse to one another,
   wherein the signal processing unit has a comparison unit, which is configured such that a first measuring signal of the first sensor element is compared with a first reference value and a second measuring signal of the second sensor element is compared with a second reference value or a value of the first measuring signal is compared with a value of the second measuring signal, and
   wherein the comparison unit has a control connection to a pulse edge generator such that a pulse edge is generated when at least one of the comparisons produces an agreement or the result of the relevant comparison changes its sign.

9. The semiconductor chip according to claim 8, wherein the magnetic field sensors are arranged in such a way that they measure the magnetic field at the same place.

10. The semiconductor chip according to claim 8, wherein at least one of the sensor elements is a vertical Hall sensor.

11. The semiconductor chip according to claim 8, wherein at least one of the sensor elements is a horizontal Hall sensor.

12. The semiconductor chip according to claim 8, wherein Hall sensors arranged with their measuring axes transverse to one another each have at least one Hall plate, and the Hall plates of the Hall sensors intersect at least in areas.

13. The semiconductor chip according to claim 8, wherein centrally between two Hall sensors at least one additional Hall sensor connected to the comparison unit is integrated into the semiconductor chip.

* * * * *